United States Patent [19]
Wallace et al.

[11] Patent Number: 5,574,829
[45] Date of Patent: Nov. 12, 1996

[54] METHOD AND APPARATUS FOR PRODUCING NEEDLEWORK CANVAS

[76] Inventors: Elizabeth Wallace; John B. Spelz, Sr., both of 134 Mountain King, Boulder, Colo. 80302

[21] Appl. No.: 178,981

[22] Filed: Jan. 7, 1994

[51] Int. Cl.$^6$ ................................ C06F 15/00
[52] U.S. Cl. ........................ 395/101; 395/117
[58] Field of Search ............ 346/1.1; 345/111, 345/101, 107, 162; 364/510; 378/4; 347/5; 503/227

[56] References Cited

U.S. PATENT DOCUMENTS

| | | | |
|---|---|---|---|
| 3,874,876 | 4/1975 | Hibino et al. | 96/84 R |
| 4,444,808 | 4/1984 | Kikuchi et al. | 427/143 |
| 4,444,833 | 4/1984 | Moriguchi et al. | 346/204 |
| 4,831,553 | 5/1989 | Yoshino | 364/518 |
| 4,892,858 | 1/1990 | Nakamine et al. | 503/227 |
| 4,981,837 | 1/1991 | Tanaka et al. | 503/227 |
| 4,987,120 | 1/1991 | Mikoshiba | 503/227 |
| 5,127,037 | 6/1992 | Bynum | 378/4 |
| 5,140,532 | 9/1992 | Beckwith, Jr. et al. | 395/1.1 |
| 5,157,761 | 10/1992 | Hawkes | 395/107 |
| 5,214,750 | 5/1993 | Minowa et al. | 395/111 |
| 5,250,956 | 10/1993 | Haselby et al. | 346/1.1 |
| 5,262,965 | 11/1993 | Putnam et al. | 395/101 |
| 5,303,341 | 4/1994 | Rivshin | 395/162 |
| 5,369,428 | 11/1994 | Maze et al. | 347/5 |

Primary Examiner—Raymond J. Bayerl
Assistant Examiner—Steven P. Sax
Attorney, Agent, or Firm—Reinhart, Boerner, Van Deuren, Norris & Rieselbach, s.c.

[57] ABSTRACT

A system and method for image transfer including means for accessing raw image date, image processing means, and means for recording the processed date onto a tangible absorptive medium, including fabric and the like.

22 Claims, 2 Drawing Sheets

METHOD AND APPARATUS FOR PRODUCING NEEDLEWORK CANVAS

This invention is related generally to system image transfer and preparation of needlework canvas patterns using permanent thermo-operative dyes.

Needlepointing and related detailed needlework techniques have traditionally been passed from one generation to another and embody the term "handicraft," in every sense of the word. However, technology has slowly been infused into the craft. Recent innovations include pre-printing a pattern on a suitable cloth support to provide the definition and intricacies desired for the final work piece. Printing techniques have followed one of three basic approaches: (1) the pattern is carefully charted out by hand on a support medium, e.g., an open mesh, heavy cloth mono-canvas, with the colors to be sewn indicated in a predetermined fashion; (2) the pattern is hand-painted on the canvas, with the colors corresponding to those to be later stitched; and (3) the pattern is imprinted on the canvas by a process similar to that referred to as "silk-screening."

Each of these three techniques is accompanied by one or more particular problems. First, the hand-charting technique is very labor-intensive and the results are unpredictable—so much so that the laborious task of sewing the entire pattern onto the support is often more desirable. Second, hand-painting is somewhat more effective than hand-charting, but limited in scope by artist talent and cost; furthermore, the technique does not lend itself to reproducibility and/or mass production. Finally, a screening-type technique, while suitable for mass production, tends to be prohibitively expensive as more than six colors are incorporated into the final pattern. A limitation of this type unnecessarily restricts the needlework pattern and impinges the creative expression of the craftsperson.

Additionally, with respect to the screening-type process, significant expenses are incurred to even slightly modify or vary the chosen needlework pattern, thereby limiting the pattern choices available to the craftsperson. A less obvious limitation of the screening-type process is the requirement that a relatively thin, smooth substrate must be used, without which the colorants will not fully penetrate the interstices—the result being incomplete color coverage and an inferior appearance. A substrate of this sort is typically considered by craftspeople as undesirable due to the lack of stiffness and material resiliency, both of which result in sewing difficulties and problems relating to finishing the needlework piece.

The search for an efficient, effective system and/or method for producing high quality needlework patterns has been an ongoing concern in the art. One approach, used with some success, has been the use of computer images transferred to a suitable substrate via thermal wax transfer materials. While this technique overcomes several concerns inherent to earlier methods, there are limitations, nonetheless. Primarily, the waxed transfer images are prepared on an expensive medium prior to transfer to the substrate. The transferred image has a wax or rubber-like consistency and is layered onto the substrate. The wax does not penetrate the substrate fibers to any significant degree, such that it may be removed relatively easily—especially so upon repeated physical contact. Furthermore, the waxy/rubbery image itself is not entirely suitable with respect to appearance, and the colors tend to bleed under heated storage conditions.

A similar approach of the prior art employs sublimation dyes to print an image, computer-generated or otherwise, onto low dye-absorbing paper, prior to heat transfer to a cloth substrate. Satisfactory color reproduction is achievable only through use of a smooth fiber substrate, preferably a polyester fabric. Alternatively, the substrate must be pre-treated to effect an impermeable seal to prevent penetration of the dye into the fiber interior, leaving the substrate surface without a pattern. Polyester substrates are generally unacceptable due to lack of stiffness, and the pre-treatment alternative adds substantially to the method cost.

In summary, a considerable number of drawbacks and problems exist in the art relating to needlework patterns and designs. There is a well-defined need for an alternative method or system by which the multitude of needlework patterns might be made more available.

Objects of the Invention

It is an object of this invention to provide a system and method for image transfer to absorptive materials, particularly fabrics, overcoming the problems and shortcomings of the prior art, including those mentioned above.

Another object of this invention is to provide a novel, integrated network of hardware and software components for efficient kinage access and storage, such that the accessed image data can be manipulated and output onto a variety of receiving media efficiently, economically and in a reproducible manner.

It is another object of this invention to provide a system and method for image transfer utilizing novel, absorptive media, not otherwise suitable for image transfer.

Another object of this invention is to provide a system and method for transfer of magnified image data onto absorptive fabric, including needlepoint canvas.

These and other important objects will be apparent from the descriptions of this invention which follow.

Summary of the Invention

This invention comprises a novel system and method for image transfer on an absorptive fabric, for use in the preparation for needlework patterns. The invention overcomes certain well-known problems and deficiencies, including those outlined above. The invention includes an improved process for transferring an image or design onto a fabric canvas, using heat and pressure sensitive dye materials. The technique permits utilization of fabrics previously thought unsuitable by way of type or dimension. Image transfer may be achieved quickly and efficiently, without loss of detail and resolution. The system of this invention allows the transfer of intricate designs in a completely reproducible manner, otherwise not possible through any method or technique of the prior art.

This invention is a system for image transfer, including: (1) means for accessing raw image date, where the accessing means includes that for image scanning and a first memory for storing the image; (2) image processing means coupled to the accessing means such that predetermined processing operations may be performed on the raw image data; and (3) means for recording the processed image onto an absorptive receiving fabric through use of a thermo-operative printing material fixable to the fabric. The image processing means includes display means coupled to the first memory and means for user input to view and manipulate the raw image data. The display means can include a video monitor for visual inspection of the scanned data. The image is manipulated by way of color variation, detail resolution, magnification, pixel interpolation, segmentation or combinations thereof to prepare a modified image for recording onto a suitable receiving medium. In preferred embodiments, the image so manipulated is stored in a second memory for recall and additional recording.

In preferred embodiments of the inventive system, the means for recording is coupled to the input means such that each pixel of a magnified image is interpolated and then segmented through use of the input means before sequentially affixed to a predetermined number of receiving medium. Preferably, substantially equal interpolated image data is affixed to each receiving medium, such that the sequential media can be recombined to provide a magnified recorded image. In highly preferred embodiments, the recombination means includes a substantially translucent surface overlying a lumination source, such that the receiving media can be aligned, without overlap, to provide the magnified image.

In preferred embodiments, the fixable printing material is selected from the group consisting of thermofusible and thermosensitive sublimation dyes. The recording means includes means for contacting the absorptive receiving material with the printing material in the presence of heat and pressure to transfer the processed image to the receiving material, such that a high resolution color image is permanently imprinted thereon.

Alternatively, this invention is a system for image transfer, including: (1) an accessor of raw image data, where the accessor includes an image and a first memory/database for storing the image; (2) an image processor coupled to the accessor such that predetermined processing operations may be performed on the raw image data; and (3) a recorder for the processed image onto an absorptive receiving fabric through use of a thermo-operative printing material fixable to the fabric. The image processor includes an image viewer coupled to the first memory and a user input module to view and manipulate the raw image data. The viewer can include a video monitor for visual inspection of the scanned data. The image is manipulated by way of color variation, detail resolution, magnification, pixel interpolation, segmentation or combinations thereof to prepare a modified image for recording onto a suitable receiving medium. In preferred embodiments, the image so manipulated is stored in a second memory/database for recall and additional recording.

In preferred embodiments of the invention system, the recorder is coupled to the input module such that each pixel of a magnified image is interpolated and then segmented through use of the input means before sequentially affixed to a predetermined number of receiving medium. Preferably, substantially equal interpolated image data is affixed to each receiving medium, such that the sequential media can be recombined to provide a magnified recorded image. In highly preferred embodiments, the recombination unit/apparatus includes a substantially translucent surface overlying a lumination source, such that the receiving media can be aligned, without overlap, to provide the magnified image.

In preferred embodiments, the fixable printing material is selected from the group consisting of thermofusible and thermosensitive sublimation dyes. The recorder includes a press apparatus for contacting the absorptive receiving material with the printing material in the presence of heat and pressure to transfer the processed image to the receiving material, such that a high resolution color image is permanently imprinted thereon.

Used in conjunction with the inventive system is a method for printing an image onto a fabric receiving medium. The method includes (1) accessing raw image data from a pre-existing visual; (2) recording the image data with a thermo-operative printing material onto a substantially non-absorptive receiving surface; and (3) contacting the non-absorptive surface with an absorptive fabric at temperature and pressure for sufficient time to effect printing material transfer from the surface to the fabric. Likewise, as with the system of this invention, the method includes processing the raw image data in such a way as to modify the color, size, resolution, pixel density, and/or unity of the image.

In preferred embodiments, the absorptive fabric is a mono-mesh canvas. In highly preferred embodiments, the printing material is a thermosensitive sublimation dye, which is contacted with the canvas fabric under temperature conditions of about 350°–410° F., for a time sufficient to effect transfer of the dye from the non-absorptive surface to the absorptive fabric receiving medium.

In highly preferred embodiments, the system of this invention can be used specifically to transfer an image onto a canvas mesh material for needlepoint handicraft. The system includes: (1) a scanner to access the raw image data and a memory/database for storing the image data; (2) a computer linked to the scanner to manipulate the image through one or more programmed operations, the computer including sufficient software capabilities; (3) another memory/database attached to the computer for storing the manipulated image data; (4) a printer equipped with thermosensitive multi-color sublimation dyes and/or ribbons to record the manipulated image; (5) a sub-luminated work surface to align and configure the recorded, manipulated image and coordinate the same with a canvas mesh material; and (6) a press to transfer the recorded image and its sublimation dye components onto the canvas mesh through application of sufficient heat and pressure.

As already noted, a printed needlework or related pattern affords certain advantages to be craftsperson. The system and method of this invention allow those advantages to be more fully realized. The image to be transferred typically takes the form of a painting or photographic reproduction, but can be presented through other media, as well. The image is loaded onto a scanner and entered onto a database for later retrieval and/or manipulation. By use of picture surface controls and a video monitor, the image can be clarified, re-colored, magnified or minified as desired. With respect to size and resolution and for purposes of needlepoint patterns, the image should not be made so fine as to impede the later stitching process. The modified/manipulated image is recorded, preferably onto a non-absorptive surface by use of a printer utilizing thermosensitive sublimation dyes, or by use of alternative equipment and apparatus well-known to those skilled in the art.

For those instances where the desired recorded image is larger than that scanned into the database, magnification and pixel interpolation can be employed to provide a larger image, without the loss of resolution. Where the recording means is restricted to use of a size-limited surface the magnified image is segmented into a number of portions, then recorded on a corresponding number of surfaces, each having substantially equal interpolated image data.

Where so segmented and printed, the recorded image is recombined to provide the desired magnified image and can be accomplished in various ways. A preferred embodiment of this aspect of the inventive system comprises a translucent work surface overlying a lumination source, such that the surfaces can be aligned and secured to provide the magnified recording image. Once the magnified image is aligned, it is secured and placed in contact with a fabric receiving medium. Application of heat and pressure, for a time sufficient to effect dye transfer, yields a fabric substrate suitable for needlework handicraft.

BRIEF DESCRIPTIONS OF THE DRAWINGS

FIG. 1 illustrates an intricate image of the type transferable through use of the present invention; and FIG. 2 is a schematic block diagram functionally illustrating a system for image transfer, in accordance with the present invention.

DETAILED DESCRIPTION OF THE DRAWINGS

Figure 1:
Figure 2:
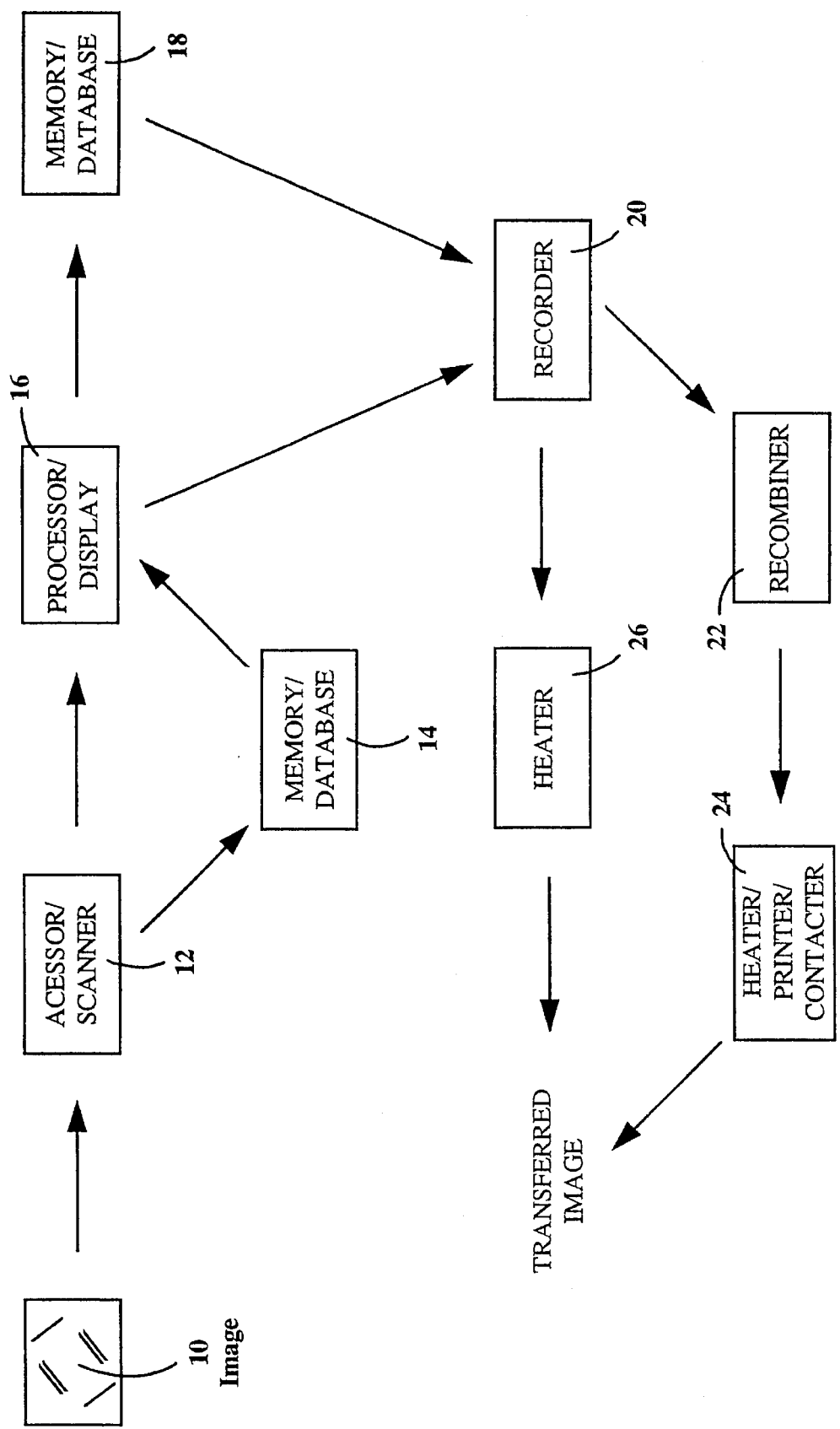

The block diagram of FIG. 2 functionally illustrates the elements of a system, in accordance with this invention, for the transfer of an image including one such as that shown on FIG. 1. The system is used in conjunction with an inventive method for imprinting images onto absorptive fabrics and the like. Without restricting or otherwise limiting the scope of the invention, hard and software components for use with the system and method described herein are as described below and, more specifically in Example 1. However, other components and, thus, embodiments are available to those skilled in the art and made aware of this invention.

FIG. 1 is a schematic representation illustrating a system/method for image transfer. As shown therein, image 10 to be transferred is a painting or photographic reproduction, loaded onto scanner 12 and entered into memory/database 14 for later retrieval and/or manipulation. By use of processor 16, including picture surface controls and a viewer display/monitor, image 10 can be clarified, re-colored, magnified or minified as desired. With respect to size and resolution and for purposes of needlepoint patterns, the image should not be made so fine as to impede the later sewing process. The modified/manipulated image can be stored in memory/database 18 and/or relayed to recorder 20; if the later, preferably onto a non-absorptive surface by use of a printer utilizing thermosensitive sublimation dyes, or by use of alternative equipment and apparatus well-known to those skilled in the art.

For those instances where the desired recorded image is larger than that scanned into memory/database 14, magnification and pixel interpolation can be employed to provide a larger image, without the loss of resolution. Where recorder 20 is restricted to use of a size-limited surface, the magnified image is segmented into a number of portions, then recorded on a corresponding number of surfaces, each having substantially equal interpolated image data.

Where so segmented and printed, the recorded image is reconstructed to provide the desired magnified image. The means to do so can be accomplished in various ways. As shown in FIG. 1, recombiner 22 is utilized and can comprise a translucent work surface overlying a lumination source, such that the surfaces can be aligned and secured to provide the magnified recording image. Once the magnified image is aligned, it is secured and placed in contact with receiving medium by use of printer 24. Application of heat and pressure, for a time sufficient to effect dye transfer, yields a fabric substrate suitable for needlework handicraft. Alternatively, the recorded image can be transferred directly on an absorptive medium through use of modified thermo-operative printing material and subsequent use of heater 26 to develop the transferred image.

The image to be transferred, using the present system and/or method, to the absorptive medium can be introduced into the computer memory by any one of several digitizing input methods well-known to those skilled in the art. The image can be created by using a drawing or painting program in conjunction with input devices such as a mouse or drawing with the output appearing directly on a computer screen, video display, and/or alternative visual monitor. Alternatively, the desired image can be introduced onto the computer memory through an input device such as a scanner or video camera in conjunction with digitizing hardware to convert the signal to a form which can be stored in the computer memory. More conveniently, the image has been previously digitized and is available on computer storage devices such as CD roms, floppy disks, or other magnetic or optical media.

Any of the generally available computer platforms are effective for use with the present system and method, and include those based on the INTEL® 80XX CPU (IBM®) and so-called "clones" of the IBM® PC, as well as the MOTOROLA® 68XXX, APPLE MACINTOSH®, ATARI®, AMIGO®, and other high-end computer systems such as IRIS®, INDIGO® and NEXT®. A preferred embodiment includes one of several MOTOROLA® 68040-based MACINTOSH® computer or an INTEL® 80486-based IBM® "clone" computer.

Once the image to be transferred is introduced onto the video memory component of the system, it can be modified in various ways to render it more suitable for recording, to enable production of the desired pattern subsequently printed using sublimation dye transfer materials and the like. The color(s), size, definition, contrast and other image characteristics and qualifies can be modified. The system and components thereof also allow removal of spurious artifacts introduced to the image through digitizing. Likewise, purely artistic considerations are manifested through the image so modified. Software is currently available to accomplish image modification; especially preferred is ADOBE PHOTOSHOP® (available on both the MACINTOSH® and IBM® platforms) and MICROGRAPH PICTURE PUBLISHER® (on the IBM®.)

Related to image modification, problems also arise with respect to color accuracy and reproducibility between the original image and that viewed on the monitor, especially so if the image is introduced by scanning or video camera. Likewise, there are invariably inconsistencies between the monitor image appearance and that subsequently recorded onto a receiving medium, inconsistencies introduced by the printer/recorder and media employed. The existence of such problems illustrates the need for the software and similar such components described above.

The technology for the production of accurately-controlled color images has been prohibitively expensive until just recently with the advent of desk top publishing. More recently, there has evolved the technology to control the color printout accuracy in relation to either the original, where some form of digitization—such as scanning or video conversion—is used, or to the image seen on the display screen—where a drawing or painting program was used to produce the original art. However, fundamental change and development continues in this area, such that even sophisticated, state-of-the-art color/control programs do not often provide satisfactory results. Even where the software functions well it does so only under very narrowly defined conditions and then, typically, only with very specific hardware.

The difficulties inherent to the software are compounded through use of the dye transfer materials on this invention. As such, programs fall into two general types. First, some programs rely on the user to compare display screen images directly with the printed output. However, color-correcting printer-drivers are typically provided which are specific to some of the more widely-used color printers. Some effort is made to standardize the appearance of the images on the display/monitor by introducing "gamma" corrections which affect the color balance of the monitor. Second, a lesscommon approach involves use of software providing standard color charts which are printed out on the user's particular equipment. The resulting printed chart image is then digitized, usually through scanning, then analyzed and compared, by the software, to the original program chart. The difference between the charts is then incorporated into a correction/calibration factor which can be applied to any image brought into the computer memory by the same type of digitization.

The first approach is very hardware specific and generally not suitable for use with the novel colored production techniques revealed here, as part of the inventive system/method. The second approach is difficult in application because the transfer steps necessarily result in a chart image (for comparison to the original) which is relatively unclear and undefined, such that the software is unable to process the image data, appropriately.

Quite unexpectedly and contrary to prior efforts in this area, the present invention, in preferred embodiments, incorporates commercially-available programs to alleviate the difficulties described above and provide consistently-excellent results. In highly-preferred embodiments, the system/method of this invention utilizes a program produced by Light Source, Inc. of Novato, Calif., as sold under the OFOTO V2.01® tradename for use with the MACINTOSH® computer systems. The color corrections introduced by the software allow efficient, convenient transfer of scanned images and productions having exact replication of color.

After all modifications and corrections are applied to the image it is printed with sublimation dyes onto a substantially non-absorptive receiving surface or, with suitably-modified dyes, directly on an absorptive fabric, such as a needlepoint canvas. As discussed above, in preferred embodiments of the invention, the transferred image is placed on an absorptive surface through use of a transfer sheet printed with a sublimation dye material. A printer component found convenient to effect this step is a SEIKO® PS or PSE thermal wax transfer unit using three color sublimation dye ribbons, available through Seiko or Fuji Films, Inc. The non-absorptive paper found most convenient is either Hammermill Laser Print paper or, for images which are full-sized, the aforementioned printer is capable of using B4-size paper, also available through Seiko, Inc.

The following non-limiting examples illustrate other features of the invention.

EXAMPLE 1

A MICROTEK SCANMAKER II® scanner was attached to the SCSI port of a MACINTOSH® Centris 650, which in turn was attached from its printer port to a SEIKO® CH4104 printer, loaded with sublimation dye 3-color ribbons from Seiko, Inc. A suitable image was scanned—in using the OFOTO® V2.01 program, to control and correct the scan process. After saving the image, the OFOTO® program was exited, before loading the ADOBE PHOTOSHOP® V2.51 program into the computer. The image was reloaded onto the ADOBE PHOTOSHOP® and modified to correct perspective and size, and to remove imperfections. The modified image was saved, then printed on a SEIKO® personal color point printer. Subsequently, as more fully described in Example 2, the image was transferred to a needlepoint canvas using a Swinger model digitally-controlled heated platen press available from Stahls Lighting Graphics.

EXAMPLE 2

A magnified image (16"×20") was printed in four 8"×10" sections on a thermal wax transfer printer having its usual wax transfer ribbon replaced by a special sublimating dye-coated ribbon. The paper used was 8½"×14" "Hammermill Laser Print." The excess paper was trimmed from the sides of the four sections joined together, and the pieces carefully aligned and attached to each other with small (½"×½") pieces of masking tape. A 20"×24" piece of "Zweigart Mono" canvas mesh was sandwiched between two pieces of plan Kraft paper (24"×28") and placed between plates of a 16"×20" heated platen press at a temperature of about 350°–410° F. The press was set at light pressure and the paper/canvas/paper sandwich was moved in sections, the press being opened each time, until the entire surface area had been exposed to the heat at least 10–20 seconds, so as to remove all traces of moisture therefrom.

The paper/canvas/paper sandwich was totally removed form the press, with the paper layers removed and put aside temporarily. The previously prepared pattern (placed either with the primed side down or up) was placed ink side down on the canvas, while the canvas was on a transparent topped table illuminated strongly from underneath so that the mesh pattern of the canvas is visible in relation to the image. The image was then carefully situated to provide the best alignment between the pattern and the meshes of the canvas. The pattern was affixed to the canvas with staples from an ordinary desk stapler—the staples being placed around the edge in the noninked area of the pattern until the pattern was well-secured to the canvas. The staples were placed at least ¾" away from the printed areas, inasmuch as for the staples will heat to a greater degree than the surrounding transfer sheet, causing a variation in the desired color. Therefore, at least a one-inch margin was left when the border of the image was trimmed.

The previous paper sheets were again used to sandwich in the pattern/canvas unit, one placed on top and the other underneath. The whole was loosely aligned and the pattern centered on the paper. The whole was stapled together to prevent shifting of layers during the subsequent thermal pressings. Again, the staples were placed so that none pressed through the colored areas of the image. The whole paper/dye transfer sheet/canvas/paper sandwich was placed on the bottom (unheated) platen of the press, separated by several inches from the upper heated section. The sandwich was moved to heat its entire area and drive-off any trace of moisture. The exact time needed depends on the area of the sandwich, but a few minutes for each press size area was sufficient enough. This process was repeated with the press closed on each area for about 15–30 seconds, with care taken to overlap the pressed area by about 4–8 inches each time.

After the entire pattern was developed by heat, the sandwich was removed from the press and the various layers separated, the canvas with its pattern permanently affixed now ready for the needlepoint user. The image transferred is stabilized and further protected on the canvas by applying a spray-coating of Blaire No-Odor Spray Fix, No. 105, available through Loctite Corporation of Cleveland, Ohio.

The method described above in Example 2 can be modified by placing a limited quantity of dye directly on the canvas, followed by heating to vaporize and develop the image by reaction/affixation of the dye with the canvas fibers. Either variation of the process is capable of producing the full range of effects described in this invention. Which variation employed depends on whether a continuous process is desired, the desired degree or resolution or clarity of pattern, or the equipment available or considered cost-effective. The first variation can lend itself more easily than the second to an arrangement where the dye printed cloth is pulled over a heated area by some agency such as mechanically driven rolls. The second approach would work just as well if due care was taken to preserve alignment, and a continuous dye transfer sheet as well as a continuous canvas were fed through a similar apparatus.

It would be expected that the pattern size of the image transferred through use of this invention would be strictly limited to the size of the available equipment, as is the case with the conventional technology. However, due to the diffusive and penetrating nature of the volatile dyes, breaks in continuity of the image can be overcome. If relative alignment of the canvas and several dye transfer sheets are maintained, an image much larger than the area of a heated platen press can be pressed in overlapping sections, with the resulting pattern free of irregularities even though some sections may be heated more than once.

The thermo-operative dye materials suitable for use with the present invention are as more fully described in U.S. Pat. No. 4,987,120, issued Jan. 22, 1991—more particularly as described in columns 2–16 and column 17 (thermosensitive transfer dyes) and column 19 (thermofusible dyes)—incorporated herein by reference, in its entirety. Such transfer dye materials would not seem appropriate for use in the preparation of needlework patterns and the like, as described herein. As discussed above, such dyes are used almost exclusively with smooth cloth fibers, such as polyester; alternatively, the fibers must be treated so as not to permit penetration of the dye material. It would seem improbable that the system and method described herein are employed with such materials, in particular sublimation dyes, to produce the intricate, highly-defined patterns observed. Quite unexpectedly, upon application of sublimating dyes to untreated needlework canvas, the resulting images illustrate exceptional depth of color and definition. No pretreatment is required despite the fiber type and absorptive qualifies inherent thereto. Likewise, it was unexpected that the results surpass those observed through use of a polyester substrate.

The use of such thermo-operative dyes on needlework canvas and related substrates is contrary to the state-of-the-art. The results obtained were quite unexpected. Without advancing any one explanation, it appears that image formation is the result of a distinct chemical reaction between the sublimated dye and the substrate fiber, such that the dye is affixed to the fiber matrix. In such a manner, the image is transferred onto the fabric without diffusion or bleeding and without loss of color or definition.

While the principles of this invention have been described in connection with specific embodiments, it should be understood clearly that these descriptions are made only by way of example and are not intended to limit the scope of the invention, in any manner. For example, any means, apparatus, or device which brings the absorptive receiving medium and the sublimated dye vapors together in close proximity, in a manner which permits a definite image to form, is suitable for use with this invention. Likewise, the nature of the receiving medium is not necessarily limited to the preferred canvas described herein. Alternatively, other suitable fibers and fabrics may be employed. Furthermore, it is contemplated that ceramic and various other inert mineral surfaces can be used in conjunction with the method and system of this invention. Other advantages and features of the invention will become apparent from the claims hereinafter, with the scope of the claims determined by the reasonable equivalents as understood by those skilled in the art.

What is claimed is:

1. A system for image transfer onto needlework canvas, comprising:

an accessor of raw image data, said accessor including an image scanner and a first memory for storing the image data;

a processor coupled to said accessor for performing predetermined processing operations on the raw image data, wherein said processor includes user input means for manipulating said image data and a display screen for visualizing the manipulation of said image data; and a recorder capable of transferring said processed image data onto an absorptive fabric medium, said recorder including a printer to transfer said image data to a non-absorptive receiving medium utilizing a thermo-operative dye, said receiving medium fixable to said absorptive fabric, said recorder including a press to transfer said image data onto said absorptive fabric by contacting said absorptive fabric with said receiving medium in the presence of heat and pressure, said fabric consisting essentially of needlework canvas, such that a high resolution image is permanently imprinted on said canvas.

2. The system as defined in claim 1 wherein said image processor further includes an image viewer coupled to said first memory, and a user input module for viewing and manipulating the raw image data.

3. The system as defined in claim 2 wherein said image viewer comprises a video monitor for viewing the raw image data scanned into said first memory.

4. The system as defined in claim 3 wherein said manipulation is selected from the group consisting of chromatic variation, detail resolution, magnification, interpolation, segmentation and combinations thereof to said viewed image.

5. The system as defined in claim 4 wherein said manipulated image data is stored in a second memory.

6. The system as defined in claim 4 wherein said recorder is coupled to said input module, such that each pixel of a magnified image is interpolated, and the image segmented then sequentially affixed to a plurality of receiving media, each said medium having substantially equal interpolated image data.

7. The system as defined in claim 6 further including an image recombiner for reconstituting said receiving media to provide a magnified recorded image.

8. The system as defined in claim 7 wherein said recombiner comprises a lumination source and a substantially translucent surface overlying said source such that said receiving media are aligned.

9. The system as defined in claim 1 wherein said printing material is selected from the group consisting of thermofusible and thermosensitive sublimation dyes.

10. A system for image transfer onto needlework canvas, comprising:

means for accessing raw image data, said accessing means including image scanning means and a first memory for storing image data;

image processing means coupled to said accessing means for performing predetermined processing operations on the raw image data, said processing means including display means coupled to said first memory means and user input means for manipulating the raw image data;

means for recording said manipulated image data onto a substantially non-absorptive receiving surface, said recording means including a printer utilizing a thermo-operative dye; and means for printing said recorded image onto an absorptive fabric medium, said printing means operative through application of heat and pressure to said receiving surface to affix said dye to said fabric, said fabric consisting essentially of needlework canvas, such that a high resolution color image is permanently imprinted.

11. The system as defined in claim 10 wherein said display means comprises a video monitor for viewing the raw image data scanned into said first memory.

12. The system as defined in claim 11 wherein said manipulation is selected from the group consisting of chromatic variation, detail resolution, magnification, minification, interpolation, segmentation and combinations thereof to said viewed image.

13. The system as defined in claim 12 wherein said manipulated image data is stored in a second memory means.

14. The system as defined in claim 12 wherein said means for recording is coupled to said input means, such that each pixel of a magnified image is interpolated, and the image segmented then sequentially affixed to a plurality of receiving media, each such medium having substantially equal interpolated image data.

15. The system as defined in claim 14 further including means for recombining said receiving media to provide a magnified recorded image.

16. The system as defined in claim 15 wherein said recombination means comprises a lumination source and a substantially translucent surface overlying said source such said receiving media are aligned without overlap.

17. A method for printing an image onto a needlework fabric receiving medium, comprising:

accessing raw image data from a pre-existing visual;

manipulating and processing said raw image data to modify image characteristics;

recording said image data with a thermo-operative printing material onto a substantially non-absorptive receiving surface;

contacting said non-absorptive receiving surface with an absorptive fabric, said fabric consisting essentially of needlework canvas, at temperature and pressure for sufficient time to transfer and affix said printing material to said fabric; and printing said material onto said fabric, such that a high resolution image is permanently imprinted on said fabric.

18. The method as defined in claim 17, wherein said processing is modifying image characteristics selected from the group consisting of color, size, resolution, pixel density and unity.

19. The method as defined in claim 17 wherein said absorptive fabric comprises a mono-mesh canvas.

20. The method as defined in claim 17 wherein said thermo-operative printing material is a thermosensitive sublimation dye.

21. The method as defined in claim 20 wherein said temperature is about 350°–410° F.

22. A system for image transfer onto a canvas mesh material for needlepoint handcraft, comprising:

a scanner to access raw image data, said scanner including a first memory for storing the image data;

a computer linked to said scanner to manipulate the image data through at least one programmed processing operation, said computer including software sufficient to manipulate the image data;

a second memory linked to said computer for storing said manipulated image;

a printer having multi-color, thermosensitive sublimation dye ribbons to record said manipulated image onto a non-absorptive receiving medium;

a sub-luminated work surface to align and configure said recorded and manipulated image cooperatively with a canvas mesh material, said material consisting essentially of a needlework canvas; and a press to transfer said recorded image onto said canvas through application of heat and pressure, such that a high resolution image is permanently imprinted on said canvas.

* * * * *